(No Model.)
W. S. BOSLEY.
CARBON BRUSH HOLDER FOR DYNAMOS.
No. 539,032. Patented May 14, 1895.
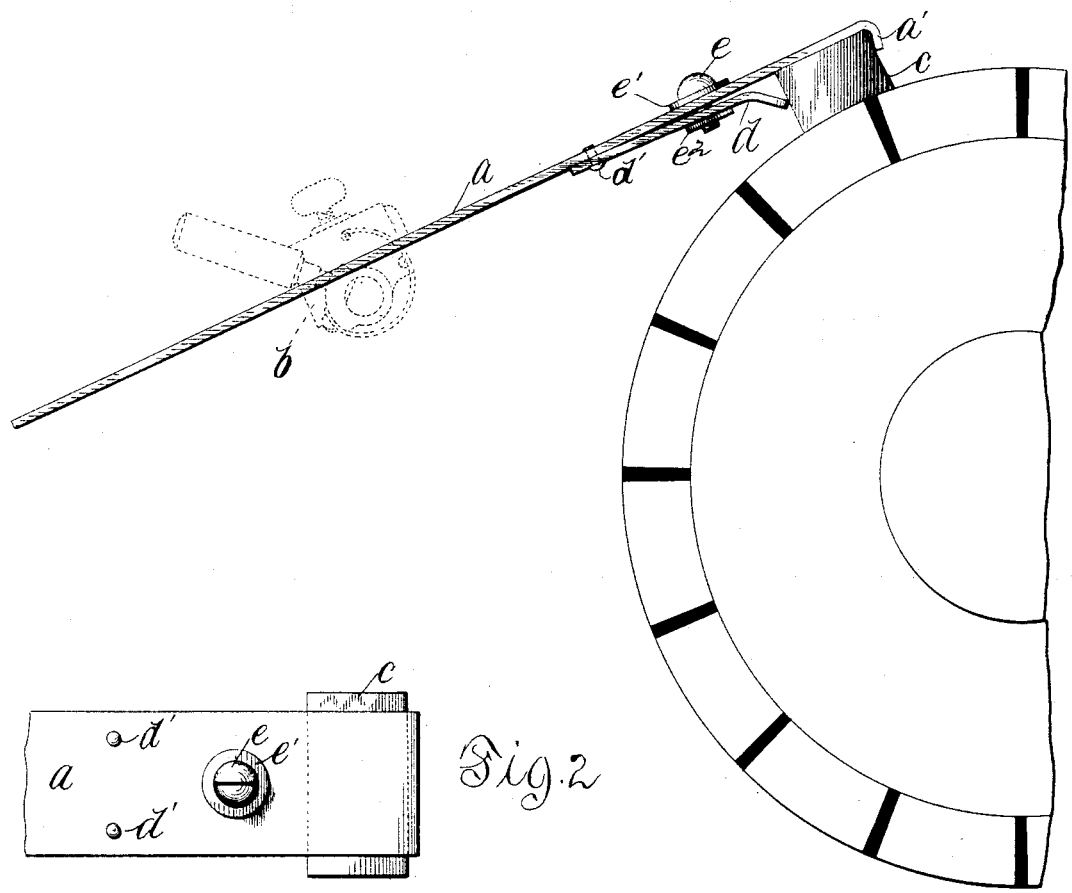
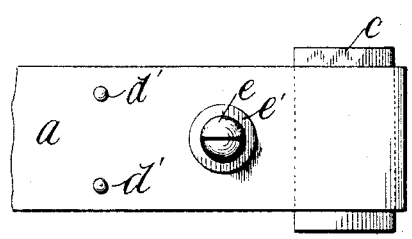
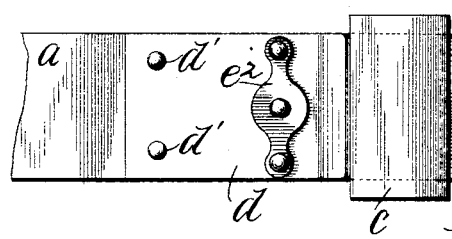
Witnesses:
George L. Cragg.
Harriet G. Templeton.
Inventor:
Winfield S. Bosley.
By Barton & Brown
Attorneys

UNITED STATES PATENT OFFICE.

WINFIELD S. BOSLEY, OF CHICAGO, ILLINOIS, ASSIGNOR TO THE WESTERN ELECTRIC COMPANY, OF SAME PLACE.

CARBON-BRUSH HOLDER FOR DYNAMOS.

SPECIFICATION forming part of Letters Patent No. 539,032, dated May 14, 1895.

Application filed September 8, 1894. Serial No. 522,442. (No model.)

*To all whom it may concern:*

Be it known that I, WINFIELD S. BOSLEY, a citizen of the United States, residing at Chicago, in the county of Cook and State of Illinois, have invented a certain new and useful Improvement in Carbon-Brush Holders for Dynamos, (Case No. 1,) of which the following is a full, clear, concise, and exact description, reference being had to the accompanying drawings, forming a part of this specification.

My invention relates to carbon brush holders for dynamos, and its object is the provision of a brush holder that shall be cheap of construction; that will permit the ready replacement of the carbon when worn, and that will clamp the carbon in such a manner as to permit the almost complete wearing away of the carbon before a removal of the same is necessitated.

My invention comprises a bar forming the body portion of the brush and adapted to be clamped in the brush holder. The end of the bar is bent or curved so that the end of the bar bears upon the carbon holder, and between the bent portion and the end of a clamping plate the carbon block is adapted to be held. The clamping plate is secured by one end to the under side of the bar and rests by its opposite end against the carbon block, a screw being passed through the bar and the plate, by means of which the bar may be moved toward the plate to clamp the block in position.

My invention will be readily understood by reference to the accompanying drawings, in which—

Figure 1 illustrates the brush of my invention applied to a commutator. Fig. 2 is a partial plan view of the brush. Fig. 3 is a partial view of the under side of the brush.

Like letters refer to like parts in the several figures.

The bar $a$, forming the body of the brush, is adapted to be held in a brush holder $b$ which may be of any suitable form, the end of the bar being bent to form a projection $a'$ against which the carbon block $c$ may be pressed to hold the same in position.

The clamping plate $d$ is secured to the under side of the bar $a$ by means of rivets $d'\ d'$, the end of the clamping plate which engages with the carbon block being bent so that it may engage the block at about the same distance from the bar as does the end of the projection $a'$.

A screw $e$ is adapted to pass through the bar $a$ and the clamping plate $d$, a washer $e'$ being provided beneath the head of the screw, while a plate $e^2$ is secured to the clamping plate $d$ and provided with a tapped hole adapted to be engaged by the threads upon the screw $e$.

By unscrewing the screw $e$ the clamping plate may be moved away from the bar $a$ to permit the insertion of the carbon block $c$ between said plate and the projection $a'$, after which the screw $e$ may be turned to draw the clamping plate $d$ toward bar $a$ and clamp the carbon block between the end of said plate and projection $a'$. The end of clamping plate $d$ engaging the block at about the same distance from the bar $a$ as does the end of the projection $a'$, the carbon block is serviceable until it has been worn down almost to the points of contact.

A brush is thus provided which is simple and economical in construction, is made of few parts, and these so arranged that there is nothing to get out of order.

Having described my invention, what I claim as new, and desire to secure by Letters Patent, is—

1. The combination with the bar upturned at its end, of a clamping plate secured by one end to said bar, a carbon block adapted to rest between said upturned end and the elevated end of said clamping plate, and a screw for moving the end of said clamping plate toward or from said bar to clamp or release the carbon block, substantially as described.

2. The combination with the bar $a$ upturned at the end to form a projection $a'$, of the clamping plate $d$ secured by one end to said bar and adapted to rest by the opposite end against the carbon block, said carbon block, the screw $e$ passing through the bar $a$ and adapted to engage a tapped hole carried upon the clamping plate $d$, substantially as described.

3. The combination with the bar $a$, the end thereof being upturned to form a projection $a'$, of the clamping plate $d$ secured by one end to said bar and adapted to rest by the opposite end against the carbon block at a distance from said bar $a$ substantially equal to the length of said upturned end, said carbon block, and the screw $e$ passing through the bar $a$ and adapted to engage a tapped hole carried upon the clamping plate $d$, substantially as described.

In witness whereof I hereunto subscribe my name this 22d day of August, A. D. 1894.

WINFIELD S. BOSLEY.

Witnesses:
CHARLES A. BROWN,
HARRIET G. TEMPLETON.